(12) United States Patent
Havens et al.

(10) Patent No.: US 7,769,779 B2
(45) Date of Patent: Aug. 3, 2010

(54) REVERSE NAME MAPPINGS IN RESTRICTED NAMESPACE ENVIRONMENTS

(75) Inventors: Jeffrey L. Havens, Issaquah, WA (US); Frederick J. Smith, Redmond, WA (US); Yousef A. Khalidi, Bellevue, WA (US); Madhusudhan Talluri, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 214 days.

(21) Appl. No.: 11/555,727

(22) Filed: Nov. 2, 2006

(65) Prior Publication Data

US 2008/0109908 A1 May 8, 2008

(51) Int. Cl.
*G06F 17/30* (2006.01)
(52) U.S. Cl. .................. 707/783; 711/101; 726/27
(58) Field of Classification Search ........................ None
See application file for complete search history.

(56) References Cited

U.S. PATENT DOCUMENTS

| | | | |
|---|---|---|---|
| 5,202,983 A | 4/1993 | Orita et al. .................. 395/600 |
| 5,627,996 A | 5/1997 | Bauer ........................ 395/500 |
| 5,689,701 A | 11/1997 | Ault et al. .................. 395/610 |
| 5,745,902 A | 4/1998 | Miller et al. ............... 707/200 |
| 5,832,512 A | 11/1998 | Mastors et al. ............. 707/202 |
| 5,995,999 A | 11/1999 | Bharadhwaj ................ 709/200 |
| 6,026,402 A * | 2/2000 | Vossen et al. .................. 707/9 |
| 6,687,701 B2 | 2/2004 | Karamanolis et al. ......... 707/10 |
| 6,789,094 B2 | 9/2004 | Rudoff et al. |
| 7,024,427 B2 | 4/2006 | Bobbitt et al. |
| 2002/0042796 A1 | 4/2002 | Igakura ...................... 707/205 |
| 2002/0095479 A1* | 7/2002 | Schmidt ..................... 709/218 |
| 2004/0128427 A1 | 7/2004 | Kazar et al. .................... 711/4 |
| 2005/0021788 A1* | 1/2005 | Tucker et al. ............... 709/229 |
| 2006/0089950 A1 | 4/2006 | Tormasov et al. |

OTHER PUBLICATIONS

Wright C.P at al. Versatility and Unix Semantics in Namespace Unification, ACM, Transaction on Storage, vol. 2, No. 1, Feb. 2006.*
"Alternate File Naming Schemes", http://gcc.gnu.org, Aug. 23, 2006, 2 pages.
"Display", http://www.qunom.com, Aug. 23, 2006, 4 pages.
Lisovsky, K. et al., "XML Path Language (XPath) and its Functional Implementation SXPath", *Institute for System Programming RAS, Moscow State University*, 10 pages.

* cited by examiner

*Primary Examiner*—Apu M Mofiz
*Assistant Examiner*—Anteneh Girma
(74) *Attorney, Agent, or Firm*—Woodcock Washburn LLP (57) ABSTRACT

A silo-specific view of the file system is provided to processes running in the silo. Processes can access a file only by uttering the silo-relative name. To determine if access to a file identified by a file ID should be permitted, a list of physical names of the file identified by the file ID is constructed. If a silo-relative name that translates to a name in the list can be uttered, the file is opened and the file ID for the opened file is retrieved. If the file IDs match, the silo-relative name is used to open the file. If a process running within a silo requests a list of names for a file that has been opened using a file ID, results returned are filtered so that only names visible in the silo are returned, thus restricting the process' access to files to those files within its hierarchical namespace.

14 Claims, 6 Drawing Sheets

REVERSE NAME MAPPINGS IN RESTRICTED NAMESPACE ENVIRONMENTS

BACKGROUND

A file system is a method for storing and organizing computer files and the data the files contain, on storage (e.g., on disk). Most file systems use an underlying non-volatile data storage device on which files are persisted. A typical storage device provides access to an array of fixed-size blocks, sometimes called sectors, which are generally 512 bytes each. The file system software is responsible for organizing these sectors into files and directories. The file system also keeps track of which sectors belong to which file and which sectors are not being used. Traditional file systems offer facilities to open, create, move and delete both files and directories.

File systems typically have data structures which associate a file name with a location on disk where the contents of the file is stored. Usually this is done by connecting the file name to an index into a file allocation table of some sort, such as the FAT in an MS-DOS file system, or an inode in a UNIX-like file system. File system directories may be flat, or may allow hierarchies. In hierarchical directories, each directory may include one or more sub-directories. In some file systems, file names are structured, with special syntax for filename extensions and version numbers. In others, file names are simple strings, and per-file metadata is stored elsewhere.

In many file systems, a file can be accessed by more than one identifier. For example, some older operating systems, (and thus older applications) only supported 8.3 file names. More current operating systems may continue to support the 8.3 file names. For example, in some older Microsoft operating systems, the "Documents and Settings" folder may have been accessed by using a name such as "DOCUME~1" (the 8.3 file name) while newer systems can either use "Documents and Settings" or "DOCUME~1" to access that folder. The "DOCUME~1" reference is a hard link to the "Documents and Settings" folder, meaning that "DOCUME~1" is a separate file system entity, and points to the same physical location as the "Documents and Setting" hard link. The same file can be accessed via either name. Additionally, the same file may be able to be opened using its file identifier or file ID, which in Microsoft operating systems is a numeric value frequently referred to as FileID. FileID is an alias because it is not a separate file system entity, but instead is another way to access the physical location of the folder.

In most current commercial operating systems an application shares file system namespaces with other applications running on the machine. The application's access to files is mediated by a security mechanism that attaches an Access Control List (ACL) to each named file. The ACL relates a user to a set of access rights for that particular resource. For example, the ACL for a particular resource may specify that user 1 is allowed read-write access to file1 and that user 2 is allowed read-only access to file1. Because of the widespread use of ACL-based permission controls, multiple applications are often allowed to share files. Access to the files is based on privileges associated with the identity of the person running the application or process rather than being based on the needs and characteristics of the application itself. This approach can be problematic. For example, a user may have broad access privileges (e.g., administrator status) because some of the programs he runs need that level of access. For example, because program_1 run by user_1 needs access to files one to ten, user_1's access privileges must permit him to access files one to ten. Suppose program_2 only needs access to files one and two. When user_1 runs program_2, program_2 will nevertheless have access to files one to ten, because user_1's privileges allow access to files one to ten. Thus, because file system operations are based on ACL-based permission controls, in general, the file system name space can be and generally is more or less global to all the processes launched by user_1 running on the machine. ACL-based permission controls lead to a number of problems including: a program could waste processing time handling things it should not consider, the presence of a new file that the program is not expecting might cause the program to operate incorrectly, different programs may write or modify the same file, causing interference and so on. This problem is exacerbated because not all programs have the same level of trustworthiness. Program 2 may not be as trustworthy as program_1 but since the user's privileges allow him to access files one to ten, program_2 has access to files one to ten and may maliciously modify them. In addition, there may be occasions when it is desirable to provide different programs different files even though the programs use the same name for the file. Finally, different programs may use the same name but mean different files. Hence, there is a need for better control of shared resources than that which can easily be obtained using ACLs and privileges.

SUMMARY

To address the need for a more powerful access control mechanism than that provided for by ACLs, a silo is created that restricts or controls the execution environment of a process, program, set of programs or application by associating with the silo a silo-specific hierarchical name space. The silo-specific name space provides a view of a global name space for the process, program, set of programs or application running in the silo. The new name space is created by creating a virtual hierarchy and joining pieces of an existing physical, non-volatile (e.g., on disk) file system to the leaf nodes of the virtual hierarchy, to create a silo-specific virtual hierarchy. The virtual hierarchy is stored in volatile storage (e.g., memory) and has no effect on the system hierarchy which is stored in non-volatile storage. The new name space may be created by merging two or more separate physical file system directories which are presented as a single (virtual) merged file system directory to an application running in the silo.

A silo-specific view of the file system hierarchy (or view of the parent hierarchy in the case of a nested silo) may be created by creating and exposing a virtual hierarchy or tree, the nodes of which may be linked back to a node or name in a physical hierarchy associated with the external system environment in which the silo resides (or to a node or name in a parent silo). A virtual hierarchy is volatile. It is not persisted to permanent storage (e.g., is not written to disk or to other stable storage media) but resides only in memory or other volatile media and may be created dynamically as the silo is initiated. When the silo exits, the virtual hierarchy may be discarded. The physical hierarchy in contrast, is permanent (persisted to stable storage) and is independent of the existence or non-existence of the silo. A silo may be implemented by having the silo provide the root for the processes running in the silo. For example, the silo may provide the root of a virtual directory to be used by a process running in the silo. The provided root may represent the root of the file system directory for the process in the silo. A process within the silo cannot see or express any names above the virtual root. One or more hierarchies may be associated with a silo.

The silo-specific hierarchical namespace can be created by pruning and/or grafting onto existing hierarchical namespaces. For example, a virtual hierarchy may be created by grafting branches from the system hierarchy onto nodes directly or indirectly attached to the virtual root associated with the silo. For the virtual file system, the grafting operation makes either a file or a directory appear at one or more places within the process's view of the file system. The virtual file system implementation effectively builds a new file system view over the system's physical file system name space.

Two or more separate physical file system directories may be presented as a single (virtual) merged file system directory to an application running in a silo. All of the operations normally available to be performed on a file system directory may be able to be performed on the merged directory, however, the operating system may control the level of access to the files in the merged directory based on how the silo namespace was originally set up. The operating system provides the merged view of the file system directories by monitoring file system requests made by processes in silos on a computer or computer system and in response to detecting certain types of file system access requests, provides the view of the seemingly merged directories by performing special processing. Examples of types of changes or requests which trigger the special processing include enumeration, open, create, rename, close or delete. One or more of the contributing directories may be a public directory and the other contributing directory may be a private directory such that a process running in the silo may have one level of access to a public contributing directory and a second level of access to a private contributing directory. Similarly, because the merged file system directory is created by combining the public directory or directories and the private directory, the same name may exist in both locations. Typically, when this happens, the physical file indicated by the private location name is accessible to the process and the physical file indicated by the name in the public location(s) is hidden and thus inaccessible to the process.

A process running within a silo can access a file in the silo's hierarchical namespace by uttering the silo-relative name of the file it wishes to access. Attempting to access the file by another name will fail. However, some file systems also allow a file to be referred to by a non-hierarchical file identifier (e.g, by the FileID), a feature important for proper execution of many applications. Thus a need exists to ascertain whether the file ID issued by a process running in a silo corresponds to a file within the silo to enable restriction of access of the process to its hierarchical namespace.

Some WINDOWS file systems provide the capability to determine a hierarchical file name or names for a given file ID, thus providing the ability to create a list of all possible names of a file. To determine if access of a process to a file identified by a file ID should be permitted, a list of physical names of the file identified by the file ID is constructed, and for each physical name in the constructed list, it is determined if it is possible to utter a silo-relative name that translates to the given physical name. This may be implemented by determining if any of the silo re-direction prefixes match the beginning of the physical name. If there is a prefix match, the file visible to the silo is opened and the file ID for the opened file is retrieved. If the file IDs match, the silo-relative name that matches the file ID is saved. If a silo name is found whose file ID matches the initial file ID, the open operation is allowed to continue using the saved silo-relative name. Acquiring the file ID of the file and comparing the acquired file ID to the originally uttered file ID is needed when the same name is used in the public and private portion of a merged directory. By comparing the original file ID with the acquired file ID, access of the process to the named file can be restricted to access of the process to the private same-named file.

Similarly, a process running within a silo may also attempt to build the name of a file that has been opened using a file ID. Results returned from the build attempt are filtered so that only names visible in the silo are returned, thus restricting the process' access to files to those files within its hierarchical namespace.

DETAILED DESCRIPTION

Overview

It is often convenient to restrict access to a named resource (such as a file) based on a hierarchical namespace layout. This may be especially important in an environment in which a resource name uttered by an application is translated before being sent to the underlying resource delivery system (e.g., file system). For example, an application may attempt to open a file by uttering a name. The uttered name may be translated. In some systems the name into which the name is translated may act to restrict access to the file. For example, perhaps by translating the file into a particular hierarchical name, the access to the file may be restricted to "read only" instead of "read-write". However, when more than one name exists for the resource, it may be possible to escape the restriction mechanism by accessing the resource using the alternate name. In other words, a party may be able to defeat or circumvent the hierarchically-defined restriction mechanism by accessing the resource via a name that does not include the directory structure. One example of such an escape mechanism is to use an alias for the file/directory such as a file ID to access the file/directory.

To address this problem, when a process in a silo attempts to access a file or directory using a FileID, embodiments of the invention examine each of the possible physical names of a file to determine if it is possible to issue a silo relative name which will translate to the physical name of the file having the provided FileID. In some embodiments this is done by determining if any of the silo redirection prefixes match the beginning of the physical name under consideration. If that file could be accessed by a process running in the silo, the file is opened within the silo view, the fileID for the file is retrieved and compared with the original file ID. If the file IDs match, access is granted. If the file IDs do not match, the request fails. Typically, an error is returned indicated that the object does not exist.

For example, suppose a process running within a silo attempts to open a the file represented by FileID 1234. The silo filtering mechanism will build up a list of all possible "names" to the file represented by the uttered FileID. For example, lets suppose one of the possible names was \X\Y\Z\B. The silo filtering mechanisms would now attempt to ascertain whether there is a name that could be uttered within the silo that would translate into \X\Y\Z\B. Let us also assume, for sake of example, that the silo namespace had a rule which translates the silo relative name \A into the physical name \X\Y\Z. Since a name uttered in the silo with a prefix of \A will translate into the physical name with a prefix \X\Y\Z, there is a way to utter a name in the silo which will result in the given physical name. The filtering mechanism will now open the candidate file, using the silo relative name "\A\B" and retrieve the FileID for it. This is important because in a merge directory scenario it is possible that there are more than one physical name that could be mapped to the silo relative name "\A\B". (For example if there is a file "B" in the private merge directory, this would hide any "B" in the public merge directory). Therefore after opening the file with the silos relative name and within the silo view the FileID for the candidate file opened is retrieved. If the file ID matches the originally uttered file id, in our case 1234, then we can allow the file to be accessed within the silo. If none of the candidate physical names can be accessed via a silo relative name, or if none of the candidate files result in the same FileID being returned, then we don't expose the file to the silo at all. The process in the silos fails to open the file, and receives a status code indicating there is no file with that file id in existence.

A process running in a silo may also try to generate one or more of a list of names for a file that has been opened using a file ID. When a silo process requests a list of physical names for a file identified by a file ID, the results returned are filtered so that only names in the silo hierarchy are returned.

Exemplary Computing Environment

Figure 1:
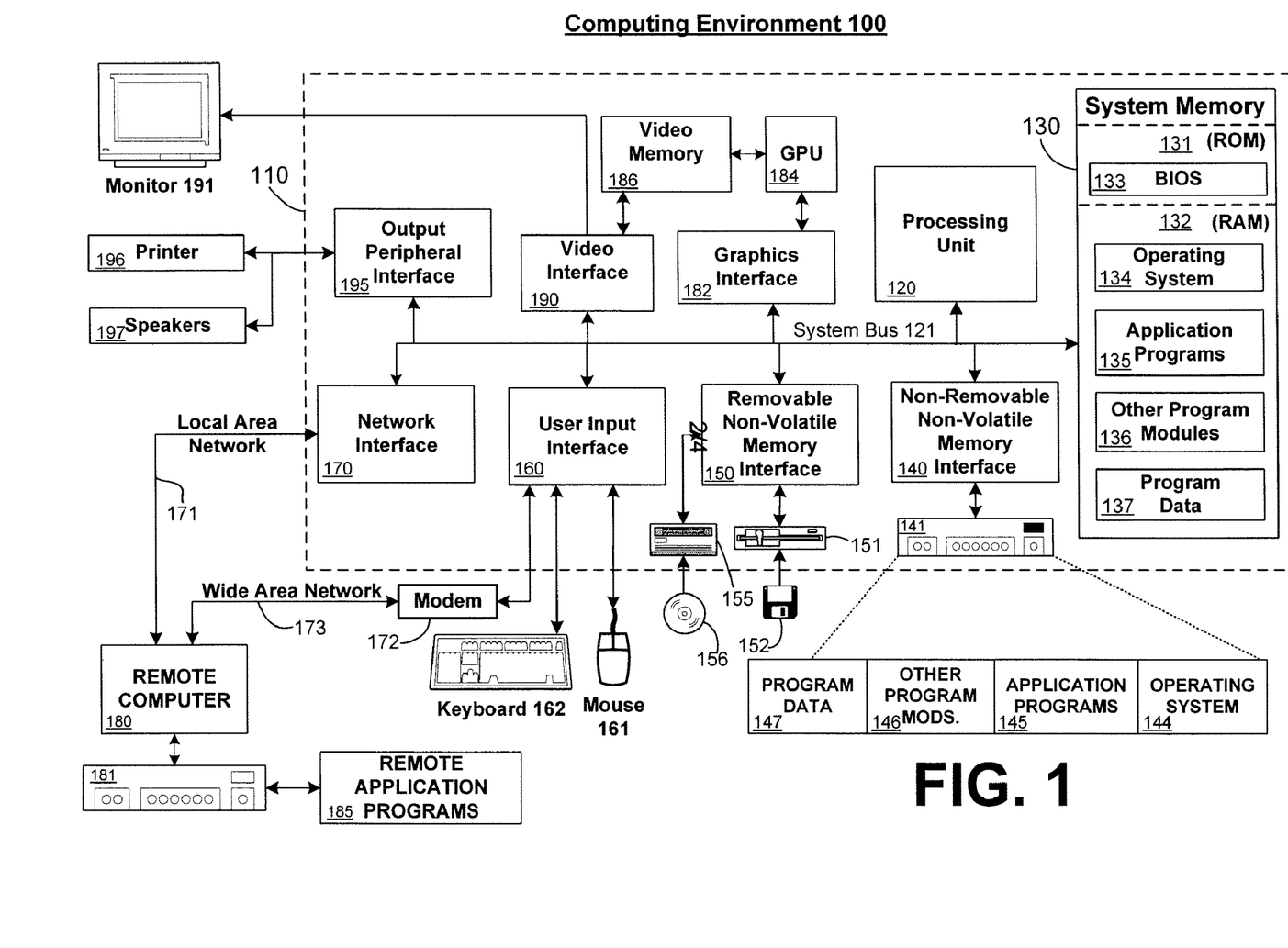
FIG. 1 is a block diagram illustrating an exemplary computing environment in which aspects of the invention may be implemented.

FIG. 1 and the following discussion are intended to provide a brief general description of a suitable computing environment in which the invention may be implemented. It should be understood, however, that handheld, portable, and other computing devices of all kinds are contemplated for use in connection with the present invention. While a general purpose computer is described below, this is but one example, and the present invention requires only a thin client having network server interoperability and interaction. Thus, the present invention may be implemented in an environment of networked hosted services in which very little or minimal client resources are implicated, e.g., a networked environment in which the client device serves merely as a browser or interface to the World Wide Web.

Although not required, the invention can be implemented via an application programming interface (API), for use by a developer, and/or included within the network browsing software which will be described in the general context of computer-executable instructions, such as program modules, being executed by one or more computers, such as client workstations, servers, or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, minicomputers, mainframe computers, and the like. The invention may also be practiced in distributed computing environments where tasks are performed by remote processing devices that are linked through a communications network or other data transmission medium. In a distributed computing environment, program modules may be located in both local and remote computer storage media including memory storage devices.

FIG. 1 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB).

A monitor 191 or other type of display device is also connected to the system bus 121 via an interface, such as a video interface 190. A graphics interface 182, such as Northbridge, may also be connected to the system bus 121. Northbridge is a chipset that communicates with the CPU, or host processing unit 120, and assumes responsibility for accelerated graphics port (AGP) communications. One or more graphics processing units (GPUs) 184 may communicate with graphics interface 182. In this regard, GPUs 184 generally include on-chip memory storage, such as register storage and GPUs 184 communicate with a video memory 186. GPUs 184, however, are but one example of a coprocessor and thus a variety of coprocessing devices may be included in computer 110. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

One of ordinary skill in the art can appreciate that a computer 110 or other client device can be deployed as part of a computer network. In this regard, the present invention pertains to any computer system having any number of memory or storage units, and any number of applications and processes occurring across any number of storage units or volumes. The present invention may apply to an environment with server computers and client computers deployed in a network environment, having remote or local storage. The present invention may also apply to a standalone computing device, having programming language functionality, interpretation and execution capabilities.

Reverse Mapping for File IDs in a Restricted Namespace Environment

Figure 2:
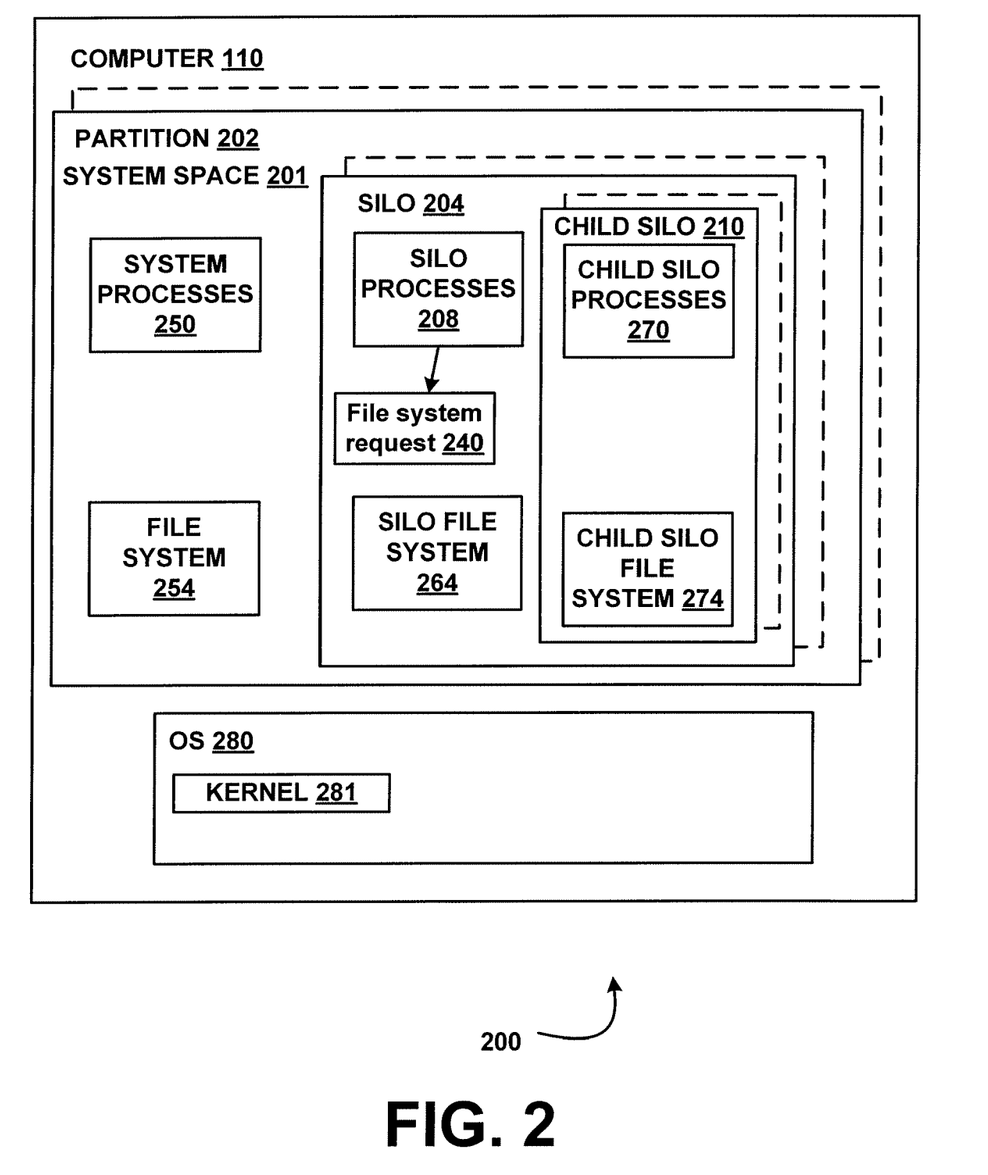
FIGS. 2 and 2a are block diagrams of a system for reverse mapping of file IDs in accordance with some embodiments of the invention.

FIG. 2 is a block diagram illustrating a system for reverse mapping of file IDs in a restricted namespace environment. Hierarchical name spaces may be used to restrict access to resources based on the process rather than permissions associated with the user running the process as described above. System 200 may reside on a computer such as the one described above with respect to FIG. 1. System 200 may include one or more partitions such as partition 202, etc. A drive letter abstraction as described above may be provided at the user level to distinguish one partition from another. Each drive letter or partition may be associated with a hierarchical data structure. Each hierarchy has a root which represents the first or top-most node in the hierarchy. It is the starting point from which all the nodes in the hierarchy originate. As each device may be partitioned into multiple partitions, multiple roots may be associated with a single device. (For example, a user's physical hard disk may be partitioned into multiple logical "disks", each of which have their own "drive letter" and their own root.) A single instance of the operating system image serves all the partitions of the computer in some embodiments of the invention.

Within each partition, system 200 may include a (global) system environment 201 and one or more restricted namespace environments. In some embodiments of the invention, the restricted environments are silos. The system environment 201 may include or be associated with a number of name spaces including but not limited to a file system name space 254 and a number of system processes 250. System 200 may also include an operating system 280. The operating system 280 may include one or more operating system components including but not limited to an operating system kernel 281. System 200 may also include other components not here shown but well known in the art.

System 200 may include one or more side-by-side silos 204, etc. in each partition or associated with each drive letter. Each silo in some embodiments is associated with its own silo process space and silo file system name space but shares a single operating system instance with all the processes in the system. For example, in FIG. 2, silo 204 is associated with silo process 208 and silo file system name space 264. Silo 204, etc. may include one or more child silos 210, etc. Silo 210 itself may include one or more child silos and so on to any degree of nesting. Child silo 210 in FIG. 2 is associated with child silo process 270 and child silo file system name space 274 but is served by the same operating system instance that serves all the other environments. A child silo may be created by a process running in its parent silo. For example, in FIG. 2, a process 208 may have created child silo 210 by creating a view into the silo 204 name space, as described more fully below. A process may not escape from its silo. For example a process in silo 204 may not escape from silo 204. Similarly, a child process of child silo process 270 may not escape from child silo 210.

The operating system 280 monitors file system access requests made by a process running in a silo. A silo-specific view of a silo-specific file system directory may be created by the operating system by an apparent merging of two or more physical backing stores (file directories) together into what appears to the silo to be a single directory. That is, two or more separate file system directories may be exposed to a silo (and the processes running within the silo) as a single directory. One or more of the physical backing stores may be used to build a portion of the silo-specific view for one or more of the silos.

A silo may be used to create an isolated namespace execution environment so that resources associated with one silo are available to processes running within that silo but are not accessible to other silos running on the computer or on other computers in the computer system or computer network. For example, referring now to FIG. 2a, if silo 204 were an isolated execution environment a resource such as a file (not shown) available to process 216 running in silo 204 would be unavailable to a process 226 or 227 running in a second silo, silo 220. A second process (e.g., process 217) running in silo 204 would however, have access to that resource. Similarly a resource available to processes running in the second silo 220 would be unavailable to processes such as process 216, 217 running in silo 204.

Alternatively, a silo may be used to create a semi-isolated, restricted or controlled execution environment in which some resources (such as files) are shared and some resources are not shared or in which some portions of a resource are shared and other portions of the resource are not shared. One such contemplated resource is the file system directory. For example, and referring again to FIG. 2a, in silo 204 one or more processes such as process 216, 217, etc. may be running and have access to a file system directory. In some embodiments of the invention, the file system directory is a virtual merge directory such as virtual merge directory 222 wherein the virtual merge directory (e.g., directory 222), although appearing to processes in silo 204 as a single physical directory is actually a virtual view of the union of two or more directories created by the operating system using callbacks to perform special processing for certain types of operations under certain circumstances. Similarly, the virtual merge directory 232 may appear to processes 226 and 227 in silo 220 as a single physical directory while it is actually a virtual view of directories 214 and 216. The view created by the operating system 280 may comprise the union of the entries of at least one (physical) public or global (to the computer system) shareable directory 214 and at least one (physical) private or local (to the silo) directory 216 merged together to create the virtual merge directory 222, although the invention as contemplated is not so limited. Similarly, a merge directory may be built up from any combination of two or more public or private directories, one or more portions or all of which is designated as read-only or read-write. Furthermore, no public backing store may exist for one or more of the contributing directories. For example, the shareable portion of the virtual merge directory created by the operating system in some embodiments of the invention is a global directory (e.g. a WINDOWS directory) while a private, unshared portion of the virtual merge directory is associated with a particular silo (e.g., with silo 204), and may represent, for example, local or private files for applications running in that silo. That is, the private portion of the virtual merge directory may be read-only or read-write or may include portions which are read-only or read-write. Similarly, the shareable portion of the virtual merge directory may be read-only or read-write or may include portions which are only read-only or read-write. Moreover, it will be appreciated that the invention as contemplated is not limited to merging two directories. Any number of directories (n directories) may be merged to create the virtual merge directory. The virtual merge directory in some embodiments of the invention is not persisted on permanent storage or created per se in memory but is dynamically deduced by the operating system 280 as required, by monitoring file access requests and performing special processing associated with the type of file access request.

Thus, it will be appreciated that as more than one silo may exist on a computer or in a computer system at one time, more than one virtual merge directory may also exist at one time, that is, there is a one-to-one correspondence between silo and virtual merge directory but any number of silos and merge directories may exist at any one time on a particular computer or computer system. (For example, in FIG. 2a, two virtual merge directories are depicted: virtual merge directory 222 including private directory 216a and WINDOWS directory 214a and virtual merge directory 232 including private directory 236a (created from private directory 203) and WINDOWS directory 214a.) Moreover, a portion of each virtual merge directory may include a shareable portion (e.g., the WINDOWS directory) which may or may not be the same for all silos in the computer system and may or may not be identical to a physical backing directory. In some embodiments of the invention, all of the applications or processes running within all the silos in the system share a single shareable portion of the silo's merge directory which may or may not exist on the particular computer on which the silo is running. Moreover, the physical directory which "backs" a shareable or unshareable portion of the merge directory may exist on removable media, such as a removable disk, CD ROM, USB key, etc. Similarly, the physical backing directory may reside on a remote system. The same is true for the private or unshareable portion of the merge directory and its backing store.

Figure 2A:
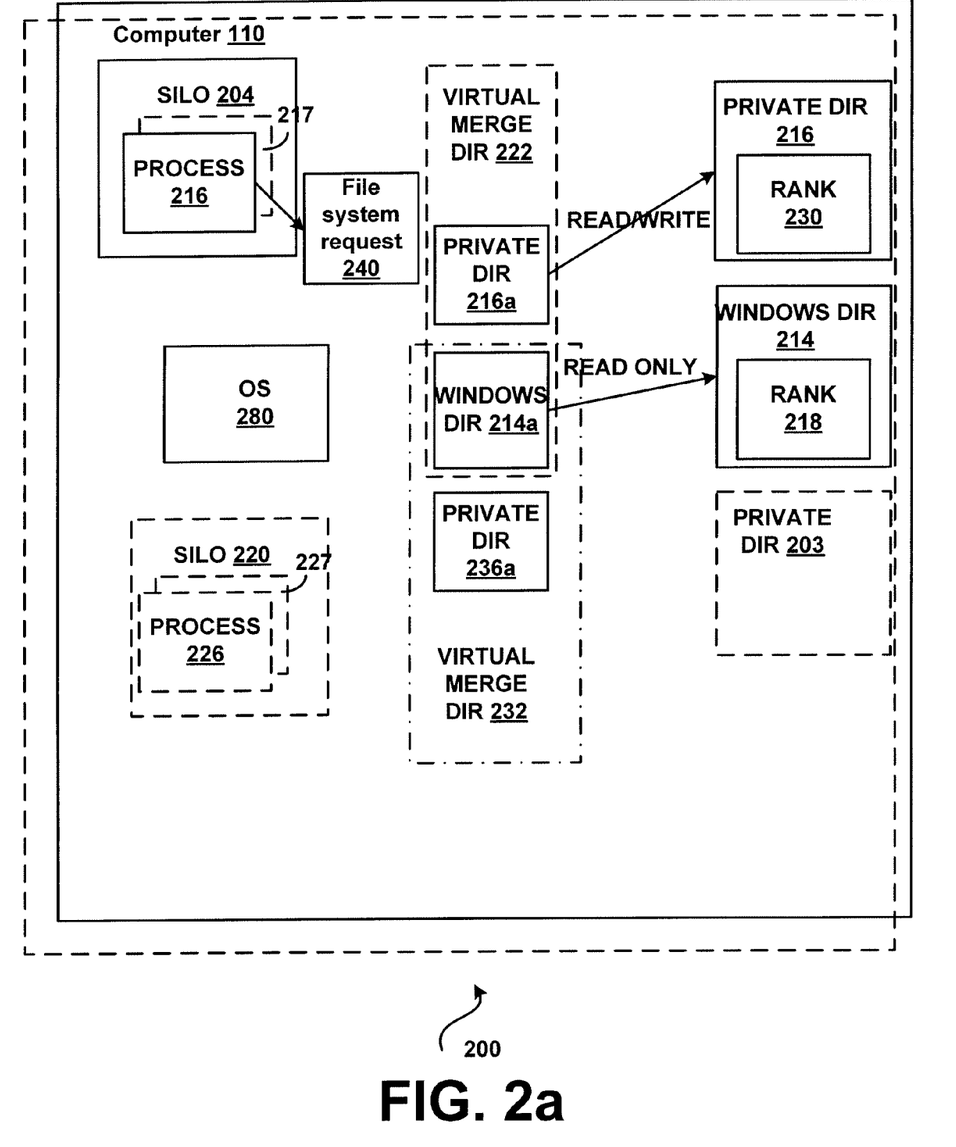

Each of the contributing (backing store) directories may be associated with a rank, (e.g, in FIG. 2a private (backing store) directory 216 is associated with rank 230, public WINDOWS (backing store) directory 214 is associated with rank 218). Rank in some embodiments is used as a tie breaker when required. For example, if a directory file access (e.g. open, enumerate, delete, etc.) is requested, and the indicated file exists in both directories under the same name, the rank of the contributing directory may be used to determine which file is exposed to the requester, that is, the file in the directory having the highest rank is exposed to the requester. Similarly, if a given name is a file in one contributing directory and the same name is a sub-directory in another contributing directory, the entry in the directory having the highest rank is exposed to the requester in some embodiments. In some embodiments of the invention, the private directory 216 is given a higher rank than the public directory 214.

In some embodiments of the invention, the operating system 280 creates the silo-specific directory via a filter driver which is able to insert itself into the code paths of operations by registering callbacks. In some embodiments of the invention, the filter drivers comprise a part of the file system. In some embodiments of the invention, For example, in FIGS. 2 and 2a operating system 280 may monitor file system access requests such as request 240 initiated by process 208, 216 or 217 in silo 204 and may perform special processing so that when an open request that uses a file ID is received, a list of physical names for the file represented by the file ID is created. For each physical name in the list, the operating system determines whether it is possible to issue a silo-relative name which translates to the given physical name. In some embodiments of the invention, this is done by determining if any of the silo redirection prefixes match the beginning of the name under consideration. If the file name could be accessed within the silo, the file indicated by the silo-relative name is opened and the file ID for the opened file is retrieved. If the file ID matches the original file ID, then the file is opened using the silo-relative name. If no silo-relative names can be created that translate to the given physical name, the open request fails. If the file indicated by the silo-relative name is opened but the file ID for the opened file does not match the original file ID, then the next name in the list is examined. This process continues until there are no more names in the list or until a file ID is found that matches. If a process such as process 208, 216 or 217 in silo 204 requests a list of physical file names for a file ID, the list that is returned is filtered so that only files in the silo hierarchy are returned to the process.

Figure 3:
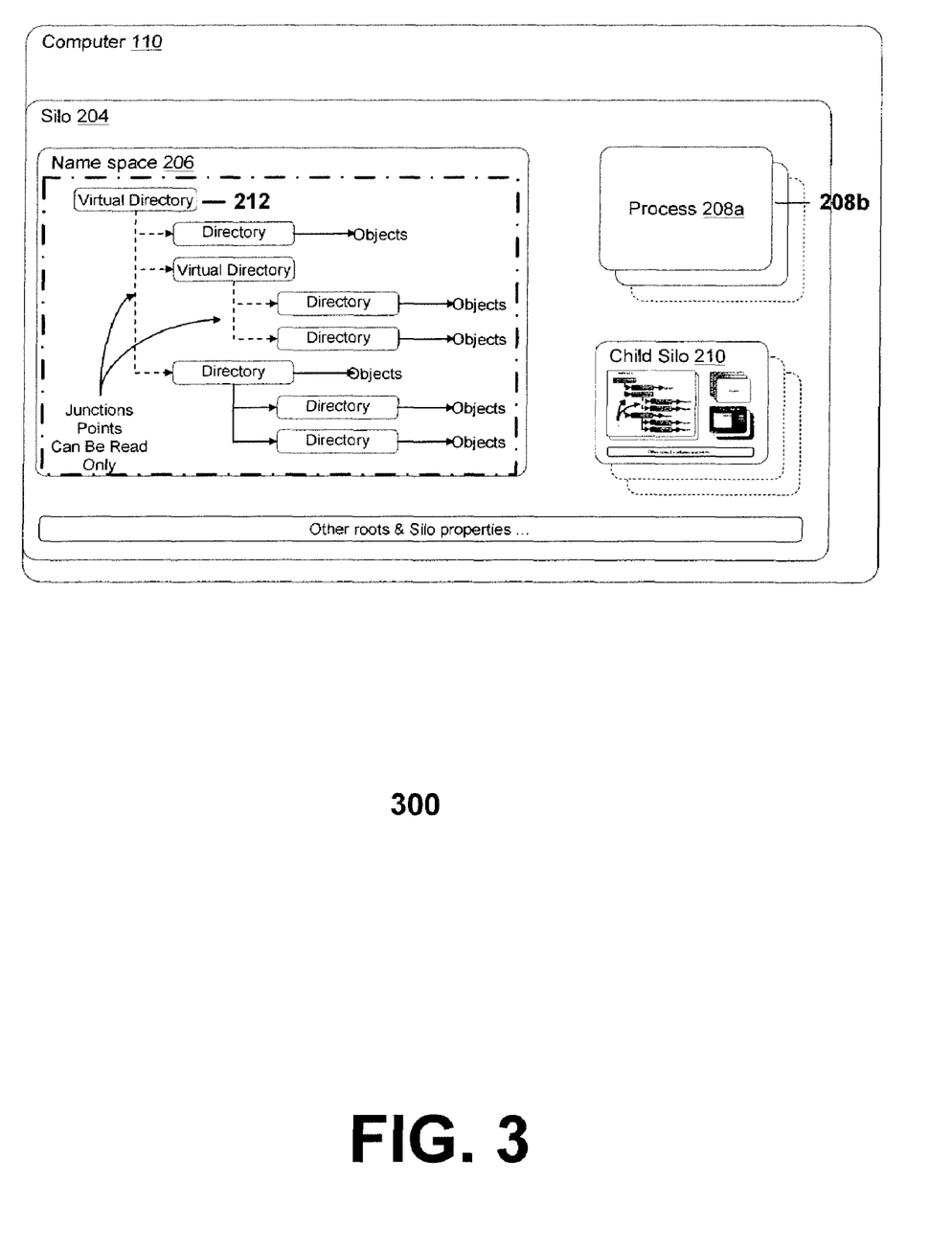
FIG. 3 is another block diagram of a system for reverse mapping of file IDs in accordance with some embodiments of the invention.

FIG. 3 is a more detailed illustration of a portion 300 of system 200. In FIG. 3, name space 206 of silo 204 on computer 110 may represent the file system name space. Each name space may have its own virtual root. For example, each silo (parent silo 204, child silo 210) may have its own virtual root for the file system (e.g., the virtual root directory 212 illustrated within name space 206 for silo 204 may be a file system virtual root directory) for each physical volume exposed to the silo. Similarly, each silo (parent silo 204, child silo 210) may have its own virtual root for the process identifier name space (e.g., the virtual root directory 212 illustrated within name space 206 for silo 204 may be a process identifier root) for each physical volume exposed to the silo, and so on. The virtual root for the silo may or may not have the same set of nodes or entries as the corresponding physical global name space of the volume, but typically it does not. The virtual root hierarchy may include junctions or links back to the physical name space. The processes in the silo (208a, 208b, etc.) therefore can be given an alternate view of the global name space on the physical volume.

In some embodiments of the invention, the operating system monitors file system access requests made by a process running in a silo and creates a silo-specific view of a file system directory by an apparent merging of two or more physical backing stores (file directories) together into what appears to the silo to be a single directory. That is, two or more separate file system directories may be exposed to a silo (and the processes running within the silo) as a single directory. One or more of the physical backing stores may be used to build a portion of the silo-specific view for one or more of the silos. In some embodiments of the invention, the merged directory view is created by monitoring file system access requests and performing special processing in response to detecting certain types of file system access requests using operating system level filter drivers and callback processing.

Figure 4:
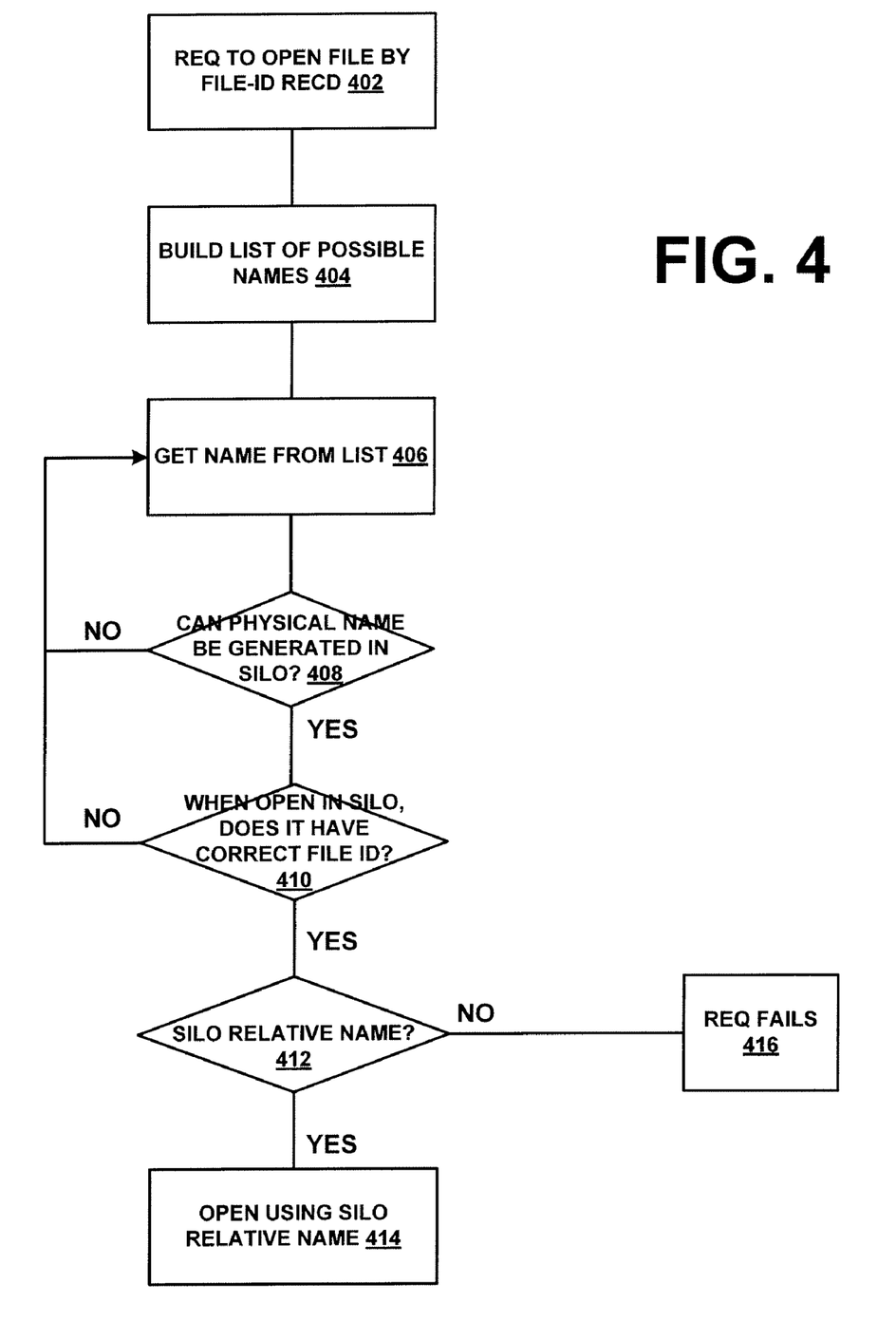
FIG. 4 is a flow diagram of a method for reverse mapping of file IDs in accordance with some embodiments of the invention.

FIG. 4 is a flow diagram of a method for reverse mapping of file IDs in a restricted namespace environment in accordance with embodiments of the invention. The operating system (e.g., OS 280 of FIG. 2, 2a) monitors file system access requests (such as file system access request 240 made by process 208, 216 or 217 running in silo 204). When at 402 a file system open request using a file ID, a list of possible physical names is created (404). The list of physical names is created by the operating system by exiting the silo view, and retrieving all possible aliases for the given file ID via standard OS mechanisms. At 406, one of the possible names is examined. At 408, the operating system determines if it is possible to utter a silo name which translates to the physical name. This is done by looking for "translation" information for the given silo namespace and determining if any of the physical prefixes matches the base of the physical name in question. For example, suppose a process running within a silo attempts to open a file by uttering the file ID 99. At 404, suppose the operating system determines that there are two names that both refer to the file identified by the file ID 99: "\Silos\0000\Program Files\Microsoft Office" and "\Silos\0000\Program Files\MICROS~1". At 406, the first name "\Silos\0000\Program Files\Microsoft Office" is selected. At 408, the operating system determines if the physical name could be generated by a process in the silo. This is achieved by seeing if any of the junctions in the current namespace are a prefix for this name. So for example, lets assume the path "Program Files" in the silo maps to "\Program Files" and "\Silos\0000\Program Files" where the former is a public read-only location, and the later is a private read-write location. Since the junction information has "\Silos\0000\Program Files" as a redirect location, and since this is a prefix to the generated possible name "\Silos\0000\Program Files\Microsoft Office" there is a candidate name, and processing continues. If there were no match, then the next possible name in the list is examined. Since a match was found, instead of opening the physical file "\Silos\0000\Program Files\Microsoft Office", the candidate silo relative name which conceivably maps to this file ("\Program Files\Microsoft Office" within the silo view) is opened within the silo view. The file ID for this file is obtained (410). If the file ID for the silo-relative file "\Program Files\Microsoft Office" and the file ID received at 402 (e.g., 99) are the same, then the name "\Silos\0000\Program Files\Microsoft Office" is converted back into a silo relative name (in the example, this would be Program Files\Microsoft Office). This is done by replacing the prefix used to match on above, by the silo prefix which it corresponds to (414), that is, in the example, "\Silos\0000\Program Files\Microsoft Office" is replaced with "Program Files\Microsoft Office". If none of the possible candidate names have silo relative equivalents (412), then the request fails (416).

Figure 5:
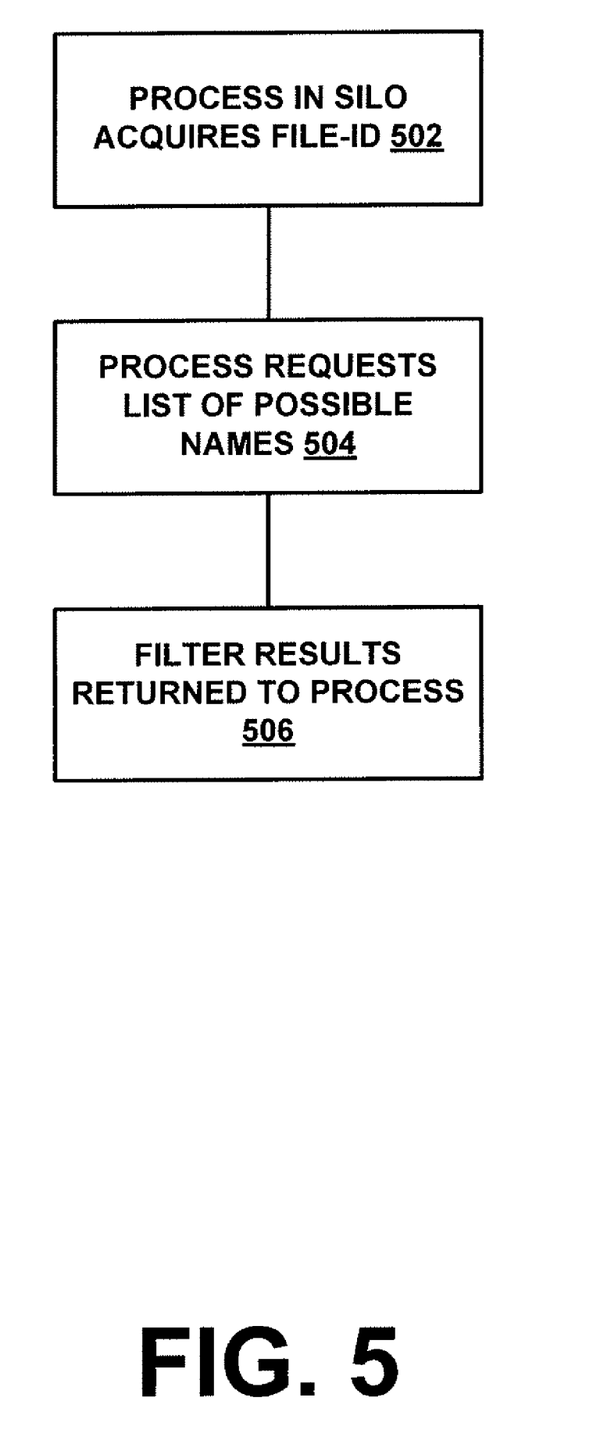
FIG. 5 is a flow diagram of a method for filtering results returned to a process that accesses a file using a file ID in accordance with some embodiments of the invention.

FIG. 5 is a flow diagram of a method for filtering results returned to a process that accesses a file using a file ID in accordance with some embodiments of the invention. At 502 a process in a silo acquires a file ID. At 504, the process may request a list of possible names that refer to the file identified by the file ID. At 506, the results that are returned are filtered so that only names that are visible in the silo are returned.

The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-specific programming models aspects of the present invention, e.g., through the use of a data processing API or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

While the present invention has been described in connection with the preferred embodiments of the various figures, it is to be understood that other similar embodiments may be used or modifications and additions may be made to the described embodiments for performing the same function of the present invention without deviating therefrom. Therefore, the present invention should not be limited to any single embodiment, but rather should be construed in breadth and scope in accordance with the appended claims.

What is claimed:

1. A system comprising a processor for restricting access to resources, the system comprising:
an operating system module, executed by the processor, adapted to serve a system processing environment, the system processing environment associated with a physical file system comprising a plurality of nodes representing files or directories; and
a restricted environment comprising:
a parent silo within the system processing environment, the parent silo associated with a first silo-specific space created by combining a portion of an existing physical file system stored in a non-volatile storage medium with a silo-specific virtual hierarchy stored in a volatile storage medium, the first silo-specific space configured for preventing a first process executing in the parent silo from accessing elements of the physical file system outside the parent silo; and
a child silo created by the first process executing in the parent silo, the child silo associated with a second silo-specific space configured for preventing a second process executing in the child silo from escaping the child silo, wherein the operating system module is configured to monitor file system access requests made by the second process executing in the child silo and dynamically create in response thereto on an as-needed basis, a child silo-specific directory comprising a virtual root, a first branch that is a virtual branch below the virtual root, and a second branch that is obtained from the physical file system and grafted below the virtual root.

2. The system of claim 1, wherein the operating system module upon detecting an open file system access request using a numeric file identifier, generates a list comprising at least one physical name for the element identified by the file identifier.

3. The system of claim 2, wherein the operating system module determines whether a silo-relative name that translates to the at least one physical name can be generated by at least one of the first or the second processes.

4. A method of restricting access to elements of a file system comprising a parent silo and a child silo, the method comprising:
providing a restricted execution environment comprising the child silo;
monitoring file system access requests made in the child silo and in response thereto, on an as-needed basis, dynamically creating a silo-specific space comprising a virtual root directory having a first branch that is a virtual branch, and a second branch that is obtained from the physical file system and grafted below the virtual root directory; and
executing a first process in the silo-specific space, wherein the first process can access only those elements visible in the hierarchical silo-specific space with no access to any element above the virtual root directory.

5. The method of claim 4, further comprising determining whether an element identified by a numeric file identifier is visible to the first process executing within the silo-specific space, wherein determining whether the element identified by the numeric file identifier is visible to the first process comprises:
receiving a file access request, the file access request identifying an element to be opened using a numeric file identifier.

6. The method of claim 5, further comprising creating a list of physical names for the element to be opened identified by the numeric file identifier by exiting the silo-specific space and retrieving a list of aliases for the element identified by the numeric file identifier.

7. The method of claim 6, further comprising examining a name in the list of aliases and determining if a silo-relative name that translates to the examined name can be generated within the child silo.

8. A computer-readable storage medium having stored thereon, computer-executable instructions that:
restrict a first set of files available to a process running in a restricted execution environment comprising a parent silo and a child silo;
monitor file system access requests made in the child silo and in response thereto, on an as-needed basis, dynamically create a first silo-specific space of a physical file system hierarchy characterized by a virtual directory having a virtual root, a first branch that is a virtual branch of the virtual root, and a second branch that is obtained from the physical file system and grafted below the virtual root, wherein a first element in the first silo-specific space is restricted to access only those elements of the physical file system visible in the first silo-specific space with no access to any elements above the virtual root.

9. The computer-readable storage medium of claim 8, comprising additional computer-executable instructions that determine a list of possible names for the first element identified by a numeric file identifier.

10. The computer-readable storage medium of claim 9, comprising additional computer-executable instructions that filter the list of possible names for the first element so that only those elements visible in the first silo-specific space are returned to the process.

11. The method of claim 4, wherein the virtual root directory is a virtual merge directory that is formed by a union of at least two directories, the virtual merge directory configured to appear as a single physical directory to the process executed in the silo-specific space.

12. The method of claim 11, further comprising providing a physical directory that backs at least a portion of the virtual merge directory.

13. The method of claim 12, wherein the physical directory is provided a rank that is used as a tie-breaker when a requested file name exists in a plurality of directories.

14. The system of claim 1, wherein the parent silo contains a parent silo file system name space and the child silo contains a child silo file system name space that is different than the parent silo file system name space.

* * * * *